Dec. 12, 1944. A. DUNN ET AL 2,364,959
SHAFT COUPLING
Filed Sept. 9, 1942
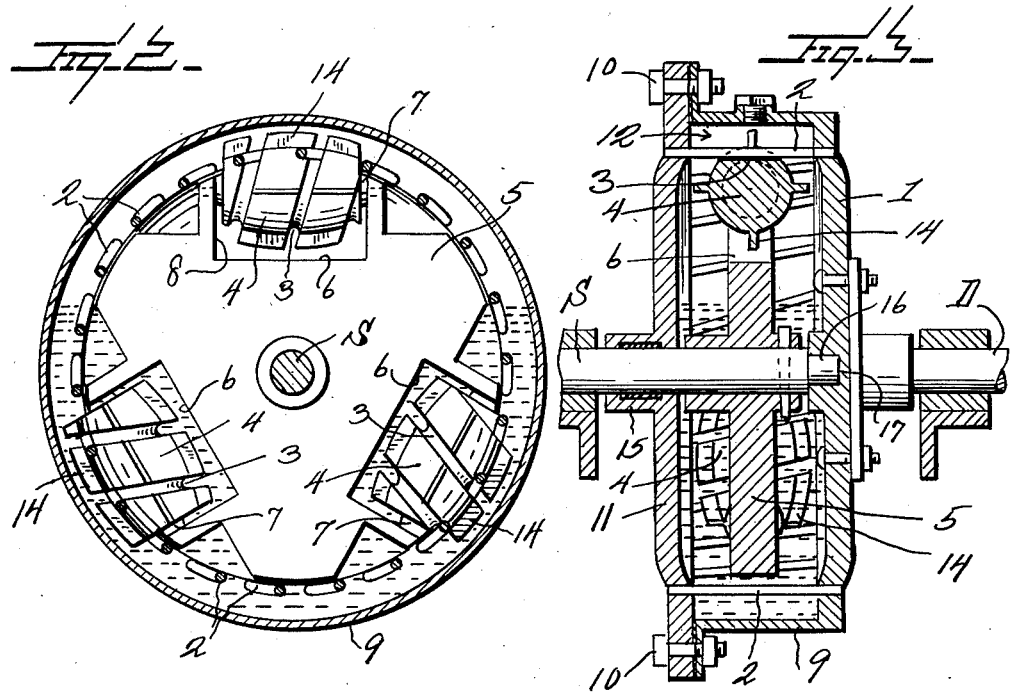
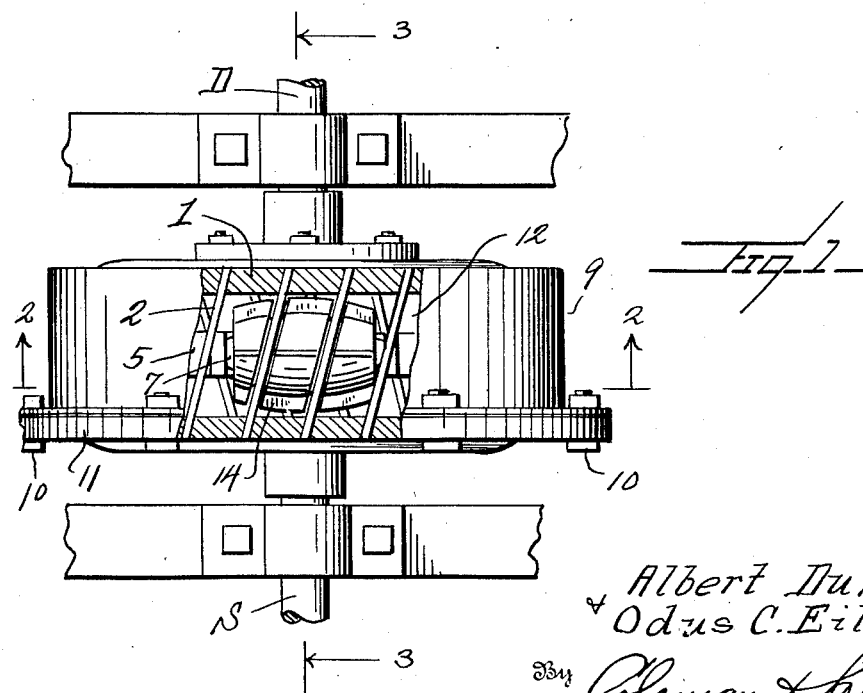
Inventors
Albert Dunn
& Odus C. Eiland
By Coleman & Lawson
Attorneys

Patented Dec. 12, 1944

2,364,959

UNITED STATES PATENT OFFICE 2,364,959

SHAFT COUPLING

Albert Dunn and Odus C. Eiland,
Mount Rainier, Md.

Application September 9, 1942, Serial No. 457,756

4 Claims. (Cl. 192—58)

This invention relates to a shaft coupling, and it is primarily an object of the invention to provide a coupling whereby two aligned shafts may be operatively connected one with the other for unitary rotation but wherein means are provided to allow one of the shafts to rotate independently of the second shaft when said second shaft is subjected to overload resulting from excessive drag, added work or from any other cause.

It is also an object of the invention to provide a coupling which affords a continuous connection between two shafts and allowing one shaft to continue to rotate when the second shaft is held against rotation by undue resistance thereon, such as resulting from overload.

It is an additional object of the invention to provide a coupling for use in connection with two aligned shafts, one of which is a driving shaft and the other a driven shaft, and wherein the driving shaft is permitted to have unhindered rotation during such periods when the rotation of the driven shaft may be retarded as the result of overload or any other cause.

A more particular object of the invention is to provide a coupling for connecting adjacent shafts and wherein said coupling comprises a pin gear carried by and rotating with one of the shafts and which is constantly in mesh with one or more worm gears carried by the second shaft and freely rotating about an axis angular to the axis of rotation of the second shaft and, furthermore, wherein the rotation of the worm gear or gears is under fluid control.

The invention consists in the details of construction and in the combination and arrangement of the several parts of our improved shaft coupling whereby certain important advantages are attained, as will be hereinafter more fully set forth.

In order that our invention may be better understood, we will now proceed to describe the same with reference to the accompanying drawing, wherein:

Figure 1 is a view, partly in top plan and partly in section, illustrating a shaft coupling constructed in accordance with an embodiment of our invention.

Figure 2 is a sectional view taken substantially on the line 2—2 of Figure 1, looking in the direction of the arrows, and Figure 3 is a sectional view taken substantially on the line 3—3 of Figure 1, looking in the direction of the arrows.

In the invention as illustrated in the accompanying drawing, D denotes a drive shaft and S a driven shaft in alignment with the shaft D. These shafts D and S are rotatably supported in any manner desired and the shaft D derives its power from any source desired.

Fixed to the extremity of the shaft D opposed to the shaft S is a disk 1 of desired dimensions and which has projecting outwardly from its peripheral portion an annular series of pins 2. These pins 2 are of required length and are equidistantly spaced around the disk 1 and are disposed on predetermined angles with respect to the axis of the shaft D and which angles are determined by the pitch of the worm grooves 3 in the worm gears or rotating elements 4 operatively carried by the adjacent end portion of the shaft S.

In the present embodiment of our invention, the gears 4 are three in number but it is to be understood that this number may be varied as the requirements of practice may prefer without affecting the required balance.

As is particularly illustrated in Figure 2 of the drawing, the gears 4 are rotatably carried by a disk 5 fixed to the shaft S for rotation therewith. Each of these gears 4 has its inner portion received in a suitable recess or cut-out 6 in the periphery of the disk 5 and the ends of the gears 4 at the axial center thereof are provided with the outstanding trunnions 7 which rotatably engage the end walls or faces 8 of the recess or cut-out 6. By this it is to be particularly noted that each of the gears 4 rotates about an axis at right angles to the axial center of the shaft S.

The periphery of each of the gears 4 has provided therein the worm groove extending from one end of the gear to the other and on such pitch as may be preferred. Each of the gears 4 is also of such length to assure at least two of the pins 2 being at all times engaged within the thread 3 and it is to be further pointed out that the gear 4 is longitudinally rounded from end to end on a curvature of a radius concentric to the radius of the circle in which is arranged the annular series of pins 2.

The disk 1 is imperforate and is provided at its peripheral portion outwardly of the pins 2 with the flange 9 disposed toward the disk 5 and of such dimensions as to entirely surround and house said disk 5. The outer portion of the flange 9 has bolted, as at 10, or otherwise securely held thereto the peripheral portion of an imperforate head or plate 11 which coacts with the flange 9 and the disk 1 to provide a chamber 12 which is adapted to contain oil or equivalent fluid in order to offer resistance to the rotation of the gears 4. To assure this resistance, the gears 4 between the convolutions of the threads 3 thereon are provided with the outstanding blades 14 disposed in a general direction lengthwise of the gear.

The central portion of the head or plate 11 is provided with a hub 15 through which the shaft S snugly passes into the chamber 12. The inserted end portion of the shaft S is reduced, as at 16, and said reduced portion 16 snugly engages within the bearing opening 17 at the axial center of the disk 1.

It is also to be noted that the pins 2 bridge the space between the disk 1 and plate or head 11 and are securely held thereto, thus providing an assembly in the nature of a cage gear.

Under normal conditions the engagement of the pins 2 with the gears 4 will lock the shafts D and S for unitary rotation but upon abnormal resistance being imposed upon the shaft S incident to overloading by reason of added work, friction of parts or excessive drag, the shaft D will continue unhindered rotation independently of the shaft S and such independent rotation will continue even though the shaft S be brought to a dead stop.

As the shaft D rotates independently of the shaft S, the pins 2 working in the worm grooves 3 will cause the gears 4 to rotate and, of course, it is this rotation of the gears 4 which allows the rotation of the shaft D independently of the shaft S. As the gears 4 rotate, such rotation will be retarded by the resistance offered by the fluid 18 within the chamber 12 against the blades 14. This fluid resistance provides a further means to maintain the shaft D against independent rotation with respect to the shaft S under normal conditions, and it is to be also pointed out that this fluid resistance also determines the extent of load for the shaft S.

The chamber 12 does not have to be filled entirely with the fluid but said chamber should be at least half full of fluid in order to best obtain the desired results. It is to be pointed out that when the chamber 12 is partially filled, centrifugal force will throw the fluid to the peripheral portion of the chamber while the shaft D is in rotation, and thus assure desired effective coaction of the fluid with respect to the gears 4.

From the foregoing description it is thought to be obvious that a shaft coupling constructed in accordance with our invention is particularly well adapted for use by reason of the convenience and facility with which it may be assembled and operated.

What we claim is:

1. Means for coupling a drive shaft and a driven shaft comprising a gear element carried by one of the shafts including an annular series of pins extending lengthwise of the shaft, said annular series of pins being concentric with the shaft, and a series of rotatable members operatively mounted upon the second shaft at points spaced therearound, said rotatable members rotating about axes angular to the axis of the first shaft, said rotatable members having worm grooves in their peripheries in which the pins of the gear element engage, each of said rotatable members being curved from end to end on an arc substantially concentric to the annular series of pins.

2. Means for coupling a drive shaft and a driven shaft comprising a gear element carried by one of the shafts including an annular series of pins extending lengthwise of the shaft, said annular series of pins being concentric with the shaft, and a series of rotatable members operatively mounted upon the second shaft at points spaced therearound, said rotatable members rotating about axes angular to the axis of the first shaft, said rotatable members having worm grooves in their peripheries in which the pins of the gear element engage, each of said rotatable members being curved from end to end on an arc substantially concentric to the annular series of pins, the pins being disposed on substantially the same angle as the pitch of the worm grooves.

3. Means for coupling a drive shaft and a driven shaft comprising a gear element carried by one of the shafts including an annular series of pins extending lengthwise of the shaft, said annular series of pins being concentric with the shaft, a series of rotatable members operatively mounted upon the second shaft at points spaced therearound, said rotatable members rotating about axes angular to the axis of the first shaft, said rotatable members having worm grooves in their peripheries in which the pins of the gear element engage, each of said rotatable members being curved from end to end on an arc substantially concentric to the annular series of pins, the element of the first-named shaft being provided with a chamber in which the rotatable members of the second shaft are housed, said chamber adapted to contain a fluid through which the rotatable members pass as the second shaft rotates, and outstanding blades carried by the rotatable members.

4. Means for coupling a drive shaft and a driven shaft comprising a gear element carried by one of the shafts including an annular series of pins extending lengthwise of the shaft, said annular series of pins being concentric with the shaft, a series of rotatable members operatively mounted upon the second shaft at points spaced therearound, said rotatable members rotating about axes angular to the axis of the first shaft, said rotatable members having worm grooves in their peripheries in which the pins of the gear element engage, each of said rotatable members being curved from end to end on an arc substantially concentric to the annular series of pins, the element of the first-named shaft being provided with a chamber in which the rotatable members of the second shaft are housed, said chamber adapted to contain a fluid through which the rotatable members pass as the second shaft rotates, and outstanding blades carried by the rotatable members, said blades extending in a general direction lengthwise of the rotatable members and being positioned between the convolutions of the worm grooves.

ALBERT DUNN.
ODUS C. EILAND.